J. ROWE.

BOOK PAD ADJUSTER FOR AUTOMATIC BOOK TRIMMING MACHINES.

APPLICATION FILED JAN. 21, 1919.

Reissued Mar. 18, 1919.

14,616.

3 SHEETS—SHEET 1.

INVENTOR

James Rowe

BY

ATTORNEY

THE NORRIS PETERS CO., PHOTO-LITHO., WASHINGTON, D. C.

J. ROWE.

BOOK PAD ADJUSTER FOR AUTOMATIC BOOK TRIMMING MACHINES.

APPLICATION FILED JAN. 21, 1919.

Reissued Mar. 18, 1919.

14,616.

3 SHEETS—SHEET 2.

INVENTOR
James Rowe
BY
Axel V. Beeten
ATTORNEY

THE NORRIS PETERS CO., PHOTO-LITHO., WASHINGTON, D. C.

J. ROWE.

BOOK PAD ADJUSTER FOR AUTOMATIC BOOK TRIMMING MACHINES.

APPLICATION FILED JAN. 21, 1919.

Reissued Mar. 18, 1919.

14,616.

3 SHEETS—SHEET 3.

INVENTOR

James Rowe

BY

ATTORNEY

THE NORRIS PETERS CO. PHOTO-LITHO., WASHINGTON, D. C.

UNITED STATES PATENT OFFICE.

JAMES ROWE, OF CHICAGO, ILLINOIS.

BOOK-PAD ADJUSTER FOR AUTOMATIC BOOK-TRIMMING MACHINES.

14,616. Specification of Reissued Letters Patent. Reissued Mar. 18, 1919.

Original No. 1,213,266, dated January 23, 1917, Serial No. 29,933, filed May 22, 1915. Application for reissue filed January 21, 1919. Serial No. 272,383.

*To all whom it may concern:*

Be it known that I, JAMES ROWE, a citizen of the United States, residing at Chicago, in the county of Cook and State of Illinois, have invented certain new and useful Improvements in Book-Pad Adjusters for Automatic Book-Trimming Machines; and I do hereby declare the following to be a full, clear, and exact description of the invention, such as will enable others skilled in the art to which it appertains to make and use the same.

This invention relates to automatic book trimming machines of the type particularly illustrated and described in Letters Patent No. 1,003,679 dated Sept. 19, 1911, and No. 1,076,726 dated October 28, 1913, and has for its particular object to provide means for adjusting the pile of books to be trimmed relatively to stop gages therefor for properly positioning all of the books in the pile relatively to the trimming plane of the trimming knife for the front edge of said pile of books.

In machines of the type referred to the books are primarily fed through the said trimming plane against disappearing gages and upon a carrier for the book pile which is equipped with means for engaging the latter as the gages disappear for carrying said book pile from the first-named trimming plane to the trimming planes of knives for trimming the ends of the books.

As feeding the book piles manually to the first-named trimming plane is very dangerous, the machine is equipped with a suitable book-pile feeding mechanism such as is described and claimed in my co-pending application Ser. No. 29,932, which has matured into Patent No. 1,213,265, of January 23rd, 1917, or such as is illustrated and described in Letters Patent No. 1,118,152, granted to me November 24, 1914. In the feed mechanism illustrated and described in said application and last-named Letters Patent respectively, the books are pushed over the surface intersected by the trimming plane of the front trimming knife and against the said disappearing stop-gages for properly positioning the book pile relatively to the trimming plane. In practice it has been found that as the book piles are relatively heavy the frictional resistance to the sliding of the book-pile over said surface causes the lowermost book or books of the pile to lag in that the lower portion of the bottom book pulls the bound edge thereof out of alinement with the higher books of the pile so that the rear or bound edges of said lower book or books are not disposed in contact with the said disappearing gages, and, accordingly, in trimming the said book pile the said lower book or books not properly positioned as aforesaid will not be trimmed to the desired dimensions. This is due also to the fact that the pusher fingers engaging the book pile to move the same into position against said disappearing gages must of necessity be sufficiently yielding to prevent injury to the book pile or breakage of the feed mechanism by exerting too strong a pressure against the said disappearing gages. The front edge of the book pile to be trimmed is necessarily rough and uneven owing to the fact that the untrimmed leaves of the book project varying distances from the bound edge or edges of said books, and it is, therefore, impossible to adjust the feed mechanism to feed said book pile with sufficient accuracy to enable rigid pusher fingers or devices to be used.

The main object of the present invention, therefore is to provide means coöperating with the book pile conveying or feeding mechanism in machines in which such mechanism is employed to give to the lower book or books of the book-pile a final impetus to throw the same against the said disappearing gages so that all books in the pile will be properly positioned relatively to the trimming knife for trimming the front edges of the books.

In the accompanying drawings I have illustrated only so much of a book-trimming machine to which the present invention is applicable as will be necessary to a complete understanding of the invention; reference being had to the aforesaid several patents for a complete understanding of the book trimming machine *per se* to which the present invention constitutes an attachment.

In said drawings illustrating a suitable embodiment of the invention:

Fig. 5 is a detail perspective view of one of the adjusting shoes employed.

Fig. 6 is a detail view in side elevation of the cam for actuating the adjusting mechanism and so much of the latter as is requisite to comprehension of its operation.

Figure 1:
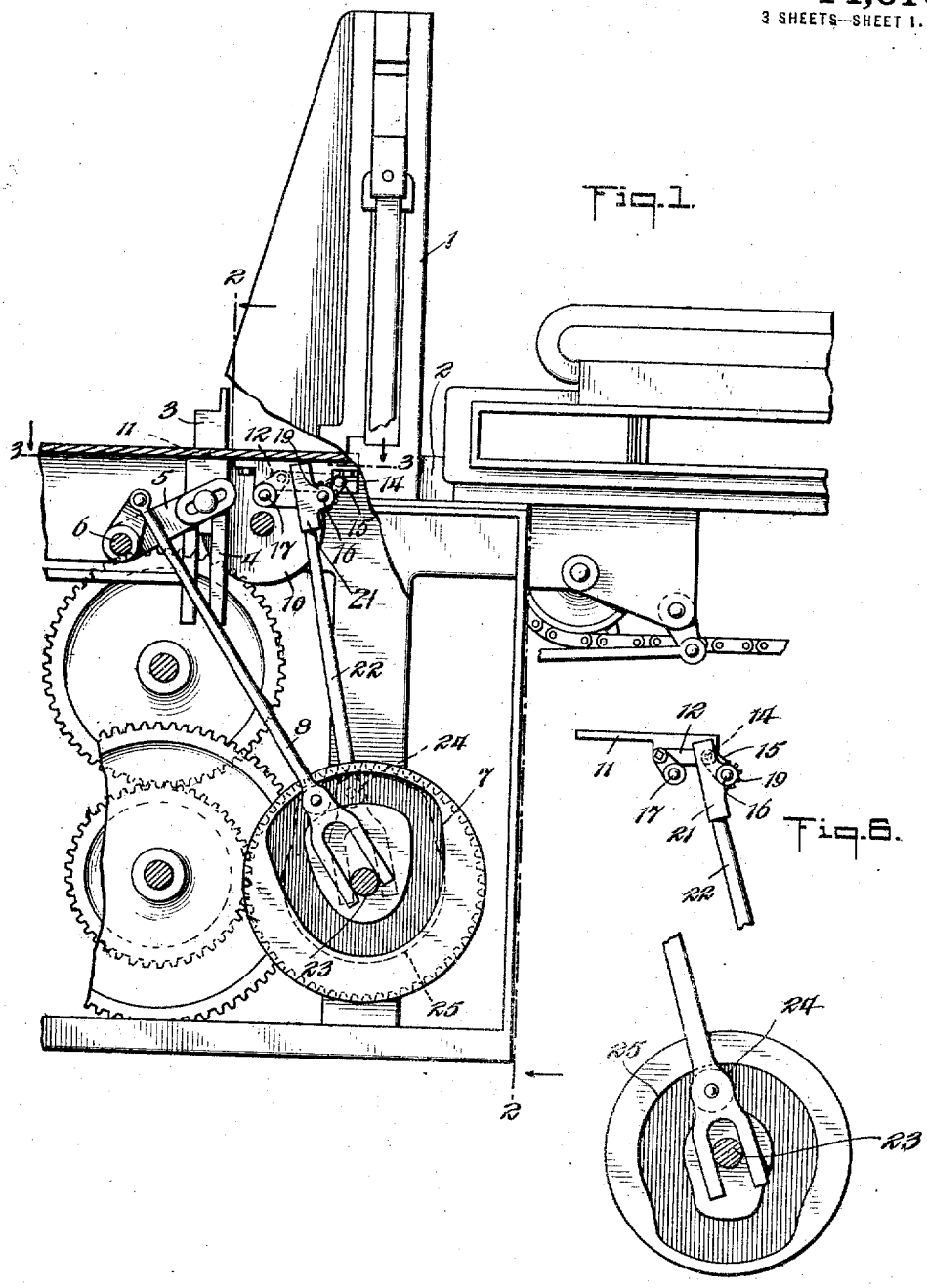
Figure 1 is a view in vertical longitudinal section partly in elevation of the front end portion of a book trimming machine of the type aforesaid equipped with an attachment constructed in accordance with my invention.
Figure 2:
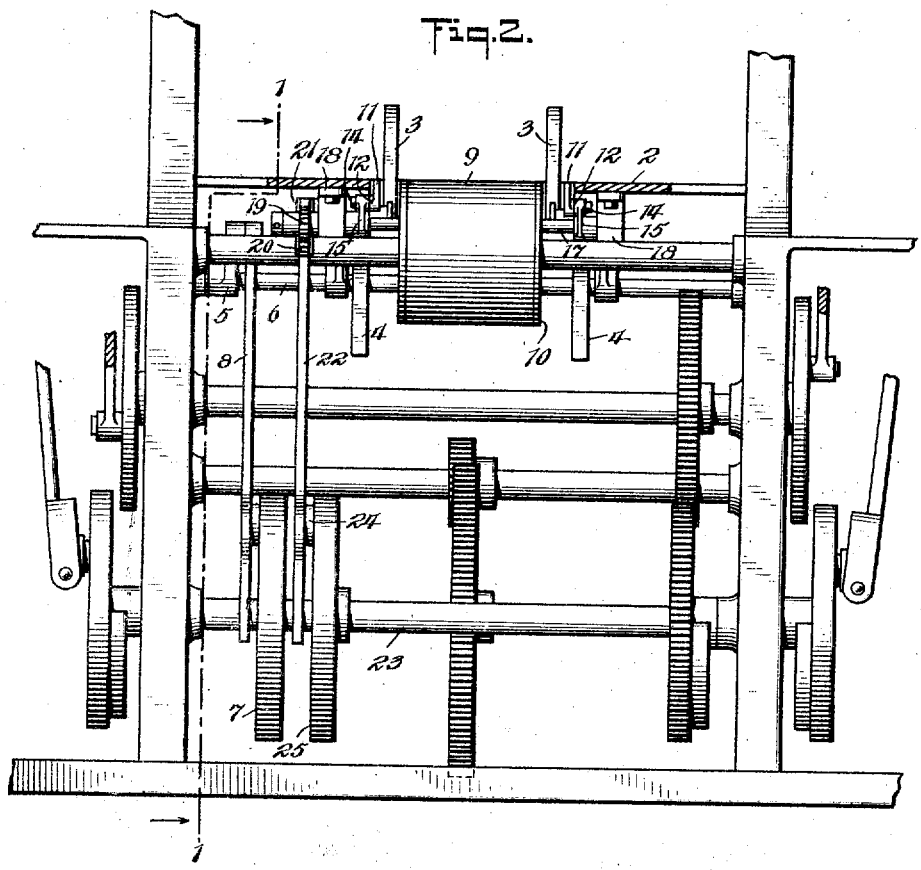
Fig. 2 is a vertical transverse section of the same on the line 2—2 of Fig. 1.
Figure 3:
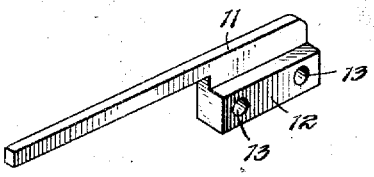
Fig. 3 is a fragmentary detail plan section on the line 3—3 of Fig. 1.
Figure 3:
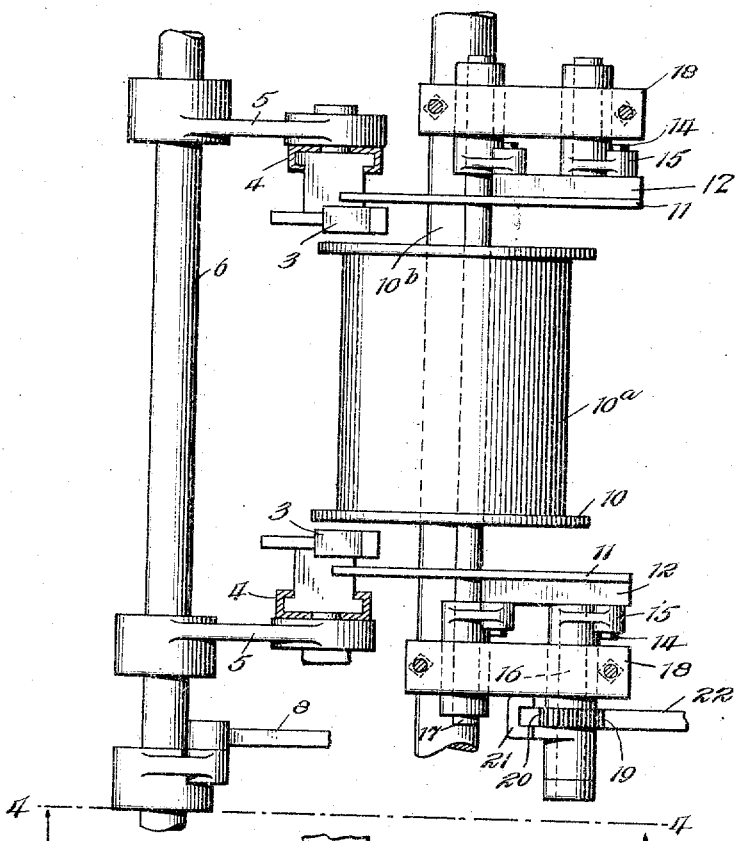
Figure 4:
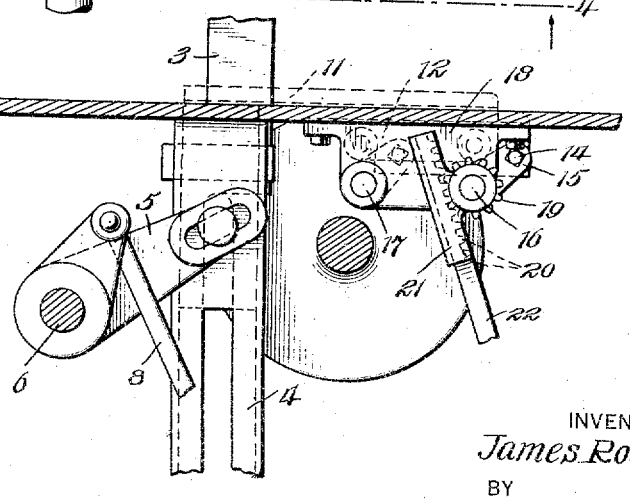
Fig. 4 is a detail vertical longitudinal section on the line 4—4 of Fig. 3.

In said drawings 1 indicates the frame in which the trimming knife for trimming the front edges of the book pile is movable, the cutting bed for said trimming knife being disposed between the ends of the book pile supporting surface 2 over which the book pile travels from an initial position at the right of the said trimming frame 1, reference being had to Fig. 1, and the stop-gages 3 against which the backs of the books of the pile bear to properly adjust said books to cause the front edges to be trimmed by the said trimming knife. The said gages 3 are vertically movable in guides 4 and are reciprocated at intervals by means of the arm 5 mounted on a rock-shaft 6 which is actuated by means of the cam 7 through the intermediacy of the rod 8. The book-pile when disposed against the said gages 3 is partially supported upon the endless carrier 9 trained over the drum 10 rotatably mounted between the cutting bed for the trimming knife and the said gages 3, said drum being rotatably mounted on a relatively large hollow rigid drum $10^a$ suitably supported on the rigid shaft $10^b$. The books are positioned or shoved over the said surface 2 by means of suitable devices described and claimed in said copending application or manually, and the backs thereof are thus brought into contact with the front edges of the gages 3 while the edges to be trimmed lie upon the cutting bed of said trimming knife. It will be seen that the book-pile supporting surface of the carrier 9 is disposed between the side portions of the book supporting surface 2 rearwardly of the trimming plane and that said gages 3 are disposed at either side of said carrier 9 and the said drum 10, over which the carrier is trained. Said supporting surfaces 2 are cut away on their opposed side edges at either side of said drum 10 to receive the shoes 11, the upper surfaces of which are normally flush with the upper surfaces of the supporting table 2 and the upper surface of the carrier 9. One of said shoes is disposed at either side of said drum and each thereof is provided in its body portion 12 with two openings 13 in which stud shafts 14 engage. Each of the latter is rotatably engaged with a short crank arm 15 rigid with rock shafts 16 and 17 respectively, journaled in bearings carried by hangers 18 mounted upon the lower face of the book supporting table 2 contiguous to the inner opposed side edges thereof. On said shaft 16 there is rigidly mounted a spur pinion 19 which meshes with rack bar 20 extending into sleeve 21 on said shaft 16; said rack bar being carried by a reciprocable rod 22 provided with a bifurcated lower end engaging the shaft 23 on which the cam 7 is carried and which is provided between its ends with an anti-friction roller 24 engaging in the groove of a cam 25 by means of which said rod 22 is reciprocated at regular intervals in synchronism with the gages, 3, the trimming knife and the feed mechanism and other parts of the machine to cause said shoes 11 to be raised and lowered at proper intervals to effect adjustment of the book pile as previously set forth. In rocking the said shaft 16 the upper or book-engaging surface of the shoes 11 will move upwardly and rearwardly toward the stop gages 3, as shown in dotted lines in Fig. 4, thereby causing the bottom book or books of the pile to be adjusted against the gages. The said shoes 11 have, as shown, very small surfaces engaging the books and such surfaces are very smooth. Thus in moving to the position shown in dotted lines said shoes coact with whatever means are employed for feeding the book pile to position the same against said gages and in performing this function they continue to move in the same direction until their upper surfaces are again in the plane of the book-supporting surfaces of the carrier and the table 2 thereby obviously depositing the book-pile upon the supporting surfaces 2 and carrier 9. They now remain in this position until the front edge of the pile has been trimmed and the same has been removed by the carrier 9. Thereupon they are returned to their first position indicated in full lines in Fig. 4 ready to receive the next book-pile.

The groove of the cam 25 is concentric with the axis of rotation of said cam through an arc of about two hundred eighty degrees and while the roller 24 is engaged in this part of said groove the shoes 11 will remain in the position shown in Fig. 6. During this period the front edge of the book-pile is trimmed and the carrier 9 then removes the same. Then the roller 24 is thrown into the part of greatest radius of the cam-groove thus returning the shoes to the position shown in full lines in Fig. 4 where they remain during only a very short interval in which the next succeeding book-pile to be trimmed becomes disposed in their path, whereupon the foregoing operation is repeated.

As previously stated the lower book of the pile is distorted rather than moved relatively to the upper books of the pile, as will occur when the covers of a bound book are moved in opposite directions relatively to the bound edge while the book is closed. In paper bound catalogues, directories, and periodicals this distortion of the bottom book will readily occur in sliding the book-pile over the supporting surface and my device is intended and adapted only to restore the book to its normal condition as it approaches its final position so that all books in the pile may be accurately and uniformly trimmed.

While the invention is particularly adapted to be used conjointly with the book pile feeding means described and claimed in my aforesaid copending application it will be understood, of course, that the same is capable of use independently thereof and may be used in a hand fed machine, equipped with mechanical feeding means other than that particularly shown and described in the aforesaid copending application, and the aforesaid Letters Patent.

I claim:

1. In a book trimming machine, in combination: gages for determining the position of a book pile to be trimmed relatively to a trimming plane, a book supporting surface over which the book pile is adapted to slide into said position, means for sliding the pile of books against the gages, and means for correcting lag of an individual book in the pile to effect uniform registration against said gages of all the books in the pile.

2. In a book trimming machine, in combination: gages for determining the position of a book pile to be trimmed relatively to a trimming plane, a book supporting surface over which the book pile is adapted to slide into said position, means for sliding the pile of books against the gages, and means for correcting lag of the lowermost book in the pile to effect uniform registration against said gages of all the books in the pile.

3. In a book-trimming machine, the combination with gages for determining the position of a book-pile to be trimmed relatively to a trimming plane and a book supporting surface over which the book pile is adapted to slide into said position, of a pair of book-pile elevating devices having their surfaces normally flush with the book supporting surface and extending from a point forward of the book-engaging surfaces of the gages to a point rearwardly thereof; and mechanism for imparting a rocking movement of said devices through an arc sufficient to effect elevation thereof and a movement toward said gages to a position flush with the book-supporting surface upon completing said movement.

4. In a book-trimming machine, the combination with gages for determining the position of a book-pile to be trimmed relatively to a trimming plane and a book supporting surface over which the book pile is adapted to slide into said position, of devices disposed contiguous to said gages for elevating the book pile above said supporting surface and moving the same toward said gages, said devices adapted to lower said book-pile upon said supporting surface as they complete their movement in said direction, and mechanism for imparting alternately opposite movements to said devices at respectively different intervals.

5. In a book trimming machine, the combination with gages for determining the position of a book-pile to be trimmed relatively to a trimming plane and a book supporting surface over which the book pile is adapted to slide into said position, of devices disposed contiguous to said gages for elevating the book pile above said supporting surface and moving the same toward said gages, said devices adapted to lower said book-pile upon said supporting surface as they complete their movement in said direction, and mechanism for actuating said devices at intervals in respectively opposite directions and maintaining the same immovable for periods alternating with the intervals of movement thereof.

6. In a book-trimming machine, the combination with gages for determining the position of a book-pile to be trimmed relatively to a trimming-plane, and a book supporting surface over which the book pile is adapted to slide into said position, of means movable in slots in the book pile supporting surface contiguous to said gages for elevating the book pile and moving the same toward said gages and depositing the same upon said supporting surface while said book pile abuts against said gages and while said devices continue their movement in said direction, and a cam actuated mechanism associated with said devices for imparting motion thereto in respectively opposite directions at predetermined intervals, and maintaining the same immovable for predetermined periods between the intervals of movement thereof.

7. In a book-trimming machine, the combination with gages for determining the position of a book pile, to be trimmed relatively to a trimming plane, and a book supporting surface over which the book pile is adapted to slide into said position, of a pair of shoes disposed contiguous to said gages and having their upper surfaces normally disposed at an elevation no higher than said book supporting surface, rocking means associated with said shoes for moving the same through a given arc intersected by the plane of the supporting surface whereby to elevate and move toward said gages a book-pile deposited upon said supporting surface in the path of said shoes and to redeposit said book pile upon said surface as said shoes complete said movement through said arc, and mechanisms for actuating said rocking means at predetermined intervals.

8. In a book-trimming machine, the combination with gages for determining the position of a book-pile to be trimmed relatively to a trimming plane, and a book supporting surface over which the book pile is adapted to slide into said position, of a pair of shoes disposed contiguous to said gages and having their upper surfaces normally disposed at an elevation no higher than and parallel with said book supporting surface, rocking means associated with said shoes for moving the same through a given arc intersected by the plane of the supporting surface whereby to elevate and move toward said gages a book pile deposited upon said supporting surface in the path of said shoes and to redeposit said book pile upon said surface as said shoes complete said movement through said arc, while maintaining said surfaces thereof parallel with said book-supporting surface, and mechanism for actuating said rocking means at predetermined intervals.

9. In a book-trimming machine, the combination with gages for determining the position of a book-pile to be trimmed relatively to a trimming plane, and a book supporting surface over which the book pile is adapted to slide into said position, of a pair of shoes disposed contiguous to said gages and having their upper surfaces normally disposed at an elevation no higher than said book-supporting surface, rocking means associated with said shoes for moving the same through a given arc intersected by the plane of the supporting surface whereby to elevate and move toward said gages a book pile deposited upon said supporting surface in the path of said shoes and to redeposit said book pile upon said surface as said shoes complete said movement through said arc, and a cam for actuating said rocking means at predetermined intervals.

10. In a book-trimming machine, the combination with gages for determining the position of a book-pile to be trimmed relatively to a trimming plane, and a book supporting surface over which the book pile is adapted to slide into said position, of a pair of shoes disposed contiguous to said gages and having their upper surfaces normally disposed at an elevation no higher than and parallel with said book supporting surface, rocking means associated with said shoes for moving the same through a given arc intersected by the plane of the supporting surface whereby to elevate and move toward said gages a book pile deposited upon said supporting surface in the path of said shoes and to redeposit said book pile upon said surface as said shoes complete said movement through said arc, while maintaining said surfaces thereof parallel with said book supporting surface, and a cam for actuating said rocking means at predetermined intervals.

Signed at Miami, in the county of Dade, and State of Florida, this 18th day of January, 1919.

JAMES ROWE.

Copies of this patent may be obtained for five cents each, by addressing the "Commissioner of Patents, Washington, D. C."